United States Patent [19]

Latsko

[11] Patent Number: 4,958,713
[45] Date of Patent: Sep. 25, 1990

[54] THERMAL BARRIER FOR CLUTCH (BRAKE) ACTUATION ELEMENT (TUBE)

[75] Inventor: James M. Latsko, North Royalton, Ohio

[73] Assignee: Eaton Corporation, Cleveland, Ohio

[21] Appl. No.: 375,328

[22] Filed: Jul. 3, 1989

[51] Int. Cl.$^5$ .................... F16D 25/04; F16D 13/10; F16D 69/04
[52] U.S. Cl. ..................... 192/88 B; 192/85 AT; 192/107 T; 188/367; 188/250 G
[58] Field of Search .............. 192/88 B, 79, 85 AT, 192/107 T; 188/365, 366, 367, 250 G

[56] References Cited

U.S. PATENT DOCUMENTS

| | | | |
|---|---|---|---|
| 2,630,198 | 3/1953 | Kraft | 192/88 |
| 2,662,625 | 12/1953 | Fawick | 192/88 |
| 2,870,891 | 1/1954 | Eakin | 192/88 |
| 3,022,877 | 2/1962 | Fawick | 192/88 |
| 3,075,624 | 1/1963 | Fawick | 192/88 |
| 3,173,526 | 3/1965 | Eakin | 192/87 |
| 3,180,468 | 4/1965 | Sidles | 192/88 |
| 4,190,136 | 2/1980 | Collins | 188/367 |
| 4,411,347 | 10/1983 | Bednar | 188/366 |
| 4,497,398 | 2/1985 | Patel | 192/79 |
| 4,795,013 | 1/1989 | Latsko | 192/88 B |

FOREIGN PATENT DOCUMENTS 721603  3/1980  U.S.S.R. .

Primary Examiner—Leslie A. Braun
Assistant Examiner—Andrea Pitts
Attorney, Agent, or Firm—M. L. Union

[57] ABSTRACT

A fluid operated coupling which includes an inflatable annular tube element of an elastomeric material moves a plurality of aligned friction shoes in a radial direction to effect a torque sustaining clutching or braking engagement. A thermal barrier is provided to retard the transfer of heat from the friction shoes to the annular tube element. The thermal barrier protects the tube element and adds mechanical strength thereto to prevent excessive elongation and extrusion of the tube element between the plurality of friction shoes when the tube element is expanded. The thermal barrier is at least partially imbedded in the exterior surface of the tube element.

3 Claims, 1 Drawing Sheet

U.S. Patent    Sep. 25, 1990    4,958,713
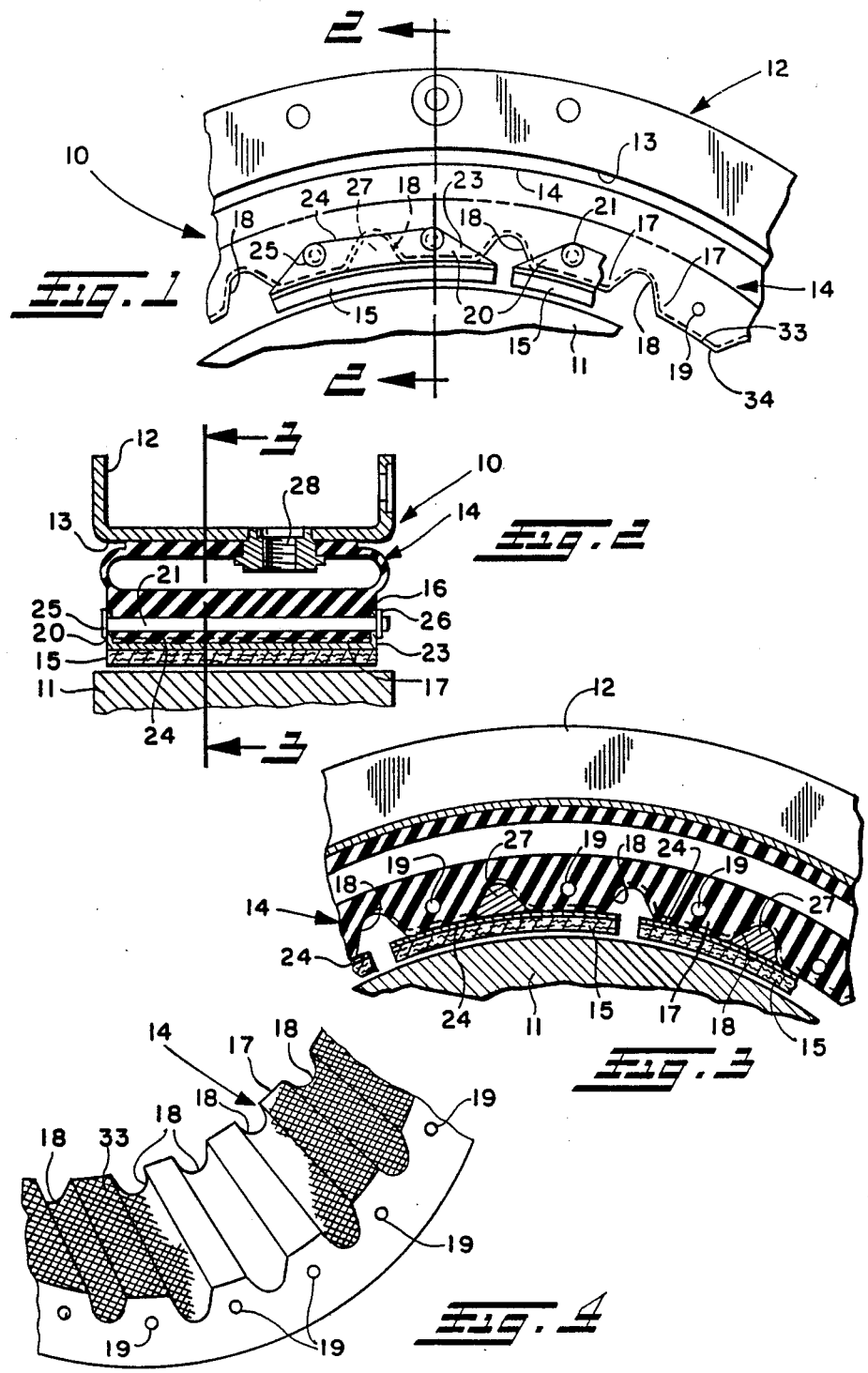

THERMAL BARRIER FOR CLUTCH (BRAKE) ACTUATION ELEMENT (TUBE)

This invention relates to a fluid operated clutch or brake of a type in which an inflatable annular tube element of elastomeric material actuates or moves a plurality of circumferentially aligned friction shoes radially outwardly or inwardly to effect torque-sustaining clutching or braking engagement. More particularly, the invention relates to clutches and brakes of the above type in which the circumferentially aligned shoes generate heat when in clutching or braking engagement and means to provide a thermal barrier to retard the transfer of heat from the friction shoes to the tube element.

Clutches and brakes of the above type have many advantages and are used in many industrial applications. In such clutches and brakes, the annular tube elements are located adjacent to the friction surfaces of the shoes and are thus exposed to high temperatures generated during clutching and braking. The tube elements are manufactured of elastomeric materials such as rubber and excessive exposure to heat is detrimental to and causes degradation and premature failure of the tube element. It should be realized that in many applications, such as braking, the kinetic energy of the object to be braked is converted to heat at the friction shoes. Obviously, the amount of heat generated can be quite substantial in some clutching and braking applications. Prior art patents such as Fawick U.S. Pat. Nos. 2,662,625 and 3,022,877 disclose clutch and brake assemblies of the above type having "ventilated" friction shoes to alleviate the damaging effect of heat. These patents also disclose means to deflect sparks away from the tube which also helps prevent damage to the tube. However, these structures require additional metal parts and at best only partially solve the problem. In clutches and brakes of the above type, the plurality of friction shoes which move with the annular element are sometimes spaced-apart. The noncontinuance of the spaced-apart friction shoes sometime allows for extrusion of the tube element as it is expanded between the adjacent friction shoes. This is particularly a problem when the tube element has been degraded due to heat deterioration.

A provision of this invention is to provide a new and improved coupling assembly of the character described having an economical thermal barrier which insulates the tube and retards the transfer of heat from the friction shoes to the tube.

A further provision of the present invention is to provide a new and improved coupling assembly of the character described above wherein the thermal barrier also functions to add mechanical strength to the tube element to prevent excess elongation and extrusion of the tube element between the plurality of friction shoes when the tube element is expanded in a radially direction.

Still another provision of the present invention is to provide a new and improved coupling including an input member, an output member rotatable relative to the input member, an annular fluid expandable tube element connected to one of the input and output members, the tube element including an exterior surface which moves radially upon expansion of the tube element, a plurality of friction shoes connected to the exterior surface of the tube element for radial movement therewith, a drum assembly connected to the other of the input and output members, the friction shoes being moveable radially with the exterior surface of the tube element when the tube is expanded to frictionally engage the drum assembly and operatively connect the input and output members. The friction shoes generate heat upon engagement of the friction shoes with the drum and the coupling assembly includes a thermal barrier to retard the transfer of heat generated by the friction shoes to the tube element.

Still another provision of the present invention is to provide a new and improved coupling as set forth in the preceding paragraph wherein the thermal barrier is a layer of fabric having a low thermal conductivity adhered to and at least partially embedded in the exterior surface of the tube element to retard the transfer of heat generated by the friction shoes toward the tube element.

It is still another provision of the present invention to further provide a new and improved coupling as is set forth in the preceding paragraph wherein the fibers add mechanical strength to the tube element to prevent excess elongation of the tube element and extrusion of the tube element between the spaced-apart adjacent friction shoes when the tube element is expanded.

BRIEF DESCRIPTION OF DRAWINGS

FIG. 1 is a fragmental side view of a clutch and brake assembly of this invention with parts broken away and in partial cross-section.

FIG. 2 is a sectional view taken along the lines 2—2 of FIG. 1.

FIG. 3 is a sectional view taken along the lines 3—3 of FIG. 2.

FIG. 4 is a fragmental perspective view more fully illustrating the tube element and thermal barrier.

DESCRIPTION OF A PREFERRED EMBODIMENT

Referring to the drawings, the coupling 10 includes a drum 11 and a rim assembly 12. The drum 11 and rim assembly 12 are rotatable relative to each other about an axis of rotation. The coupling 10 can be used as a brake or a clutch. If it is desired to utilize the coupling 10 as a clutch, the drum 11 and rim assembly 12 will be operatively connected to relatively rotatable input and output members, not illustrated. One of the members will be connected to the drum 11 to effect rotation thereof and the other member will be connected to the rim assembly 12. When the coupling 10 is energized, the drum 11 will be coupled to the rim assembly 12 and rotation of one member will effect rotation of the other. If it is desired to utilize the coupling 10 as a brake, one of the drum 11 and rim assembly 12 will be fixed and the other will be rotated relative thereto. Typically, the drum 11 will be connected to a driven shaft which is to be braked by connecting the rotatable drum 11 to the rim assembly 12 which is fixed to thereby effect braking of the drum 11 and the driven shaft connected therewith.

Accordingly, the term coupling as used herein will refer to either a clutch or brake assembly. While a preferred embodiment of the invention is disclosed as a constriction coupling wherein the tube element moves friction shoes in a radially inwardly direction to couple, the present invention can also be used in an expanding coupling such as described in U.S. Pat. No. 4,497,398 which is incorporated herein by reference wherein the tube moves the friction shoes radially outwardly to effect coupling.

An annular fluid expandable tube or bladder element 14 made of an elastomeric material such as reinforced rubber is bonded to an annular surface 13 of an annular rim assembly 12. The tube element 14 includes an annular wall 16 formed of a thick layer of rubber having a series of axially extending projections or lugs 17 formed therein and spaced-apart by axially extending grooves 18 which are equally spaced apart around the wall 16 of the tube element 14. Each of the lugs 17 includes a pair of axially extending holes 19 therein.

A plurality of spaced-apart shoe members 20, each of which has attached thereto a friction pad 15, are connected to the wall 16 of the tube element 14 by pins 21 which extend through each of the holes 19 in the tube element 14 and through pairs of aligned openings in the side flanges 23 of the backing plate 24 of the shoes 20. The pins 21 are provided with a suitable head 25 at one end and a removable head 26 at the other end to permit any given shoe to be removed from the tube for replacement. It is seen that each lug 17 includes a pair of holes 19 and each shoe member 20 is supported by a pair of pins 21 extending through holes 19 in adjacent lugs 17.

A driving bar 27 is suitably attached to each of the backing plates 24 and extends in a generally axial direction into the axially extending grooves 18 formed in the tube element 14 between adjacent lugs 17. The driving bars 27 have a cross-sectional shape which fits and compliments the cross-sectional shape of the grooves 18 in the tube element 14 to supplement the transfer of torque between the shoes 20 and the tube 14 as is more fully disclosed in U.S. Pat. No. 4,795,013 which is incorporated herein by reference.

The tube element 14 includes an inlet 28 which communicates with the interior of the tube 14, to permit a fluid such as compressed air to be injected into the tube element causing movement of the wall 16 in a radially inward direction toward the axis of rotation so that the friction shoes 20 are moved into contact with the outer surface of the drum 11 to thereby couple the drum 11 to the tube element 14 and the rim assembly 12 in a well known manner.

In accordance with this invention a fabric layer 33 of fiber is adhered to and at least partially embedded in the external circumferential surface 34 of the tube 14 to form a thermal barrier retarding the transfer of heat generated by the friction shoes contacting the drum 11 during operation. As shown in FIGS. 1 through 3, the surface 34 is formed by the external surfaces of the lugs 17 and grooves 18 which are in contact with the backing plate 24. Accordingly, the thermal barrier layer 33 insulates the tube 14 from conduction of heat from the metal backing plates 24.

The thermal barrier fabric layer 33 is made of various fiber yarns such as a aramid, or silica based yarn each of which have a low coefficient of thermal conductivity (K). The K values for the above fibers are approximately 0.3 for aramid and silica based yarn. Obviously, the lower the K value the more desirable the fabric is as a thermal barrier. Preferably, the layer 33 is made of a yarn of cross woven weave which is light weight, has high abrasion resistance, withstands high temperatures and is chemically resistant.

FIG. 4 is an enlarged section view of the surface wall 16 of the tube showing the thermal barrier layer 33 adhered to and at least partially embedded in the exterior surface 34 of the wall 16. The elastomeric material or rubber at the exterior surface fills some or all of the interstices between the warp and fill yarn and part of the yarn remains exposed. Preferably, the individual strands of fabric are skewed relative to the radial expansion of the tube to allow the fabric to expand upon expansion of the fluid element 14 without stretching the individual strands of fabric.

While the present embodiment has been disclosed as utilizing friction shoes 20 to engage with the surface of drum 11 and effect coupling of the input and output members, in certain low torque applications the use of friction shoes 20 may be eliminated and the thermal barrier fabric 33 may directly engage with the surface of drum 11 to couple the input and output members. In such low torque applications the thermal barrier fabric 33 will frictionally engage with the drum 11 to couple the drum 11 and tube element 14. The thermal barrier fabric 33 will retard the heat transfer to the tube element 14 due to the friction engagement of the fabric 33 and the drum 11.

Although the invention has been described with respect to a radially inwardly expanding tube causing the friction shoes to move radially inwardly against a rotatable drum 11, it is apparent that the invention may be applied to a coupling in which the shoes move radially outwardly into contact with a rotating member.

What we claim is:

1. A fluid expandable coupling comprising an input member, an output member rotatable relative to said input member about an axis of rotation, an annular fluid expandable tube element connected to one of the input and output members, said tube element including an exterior surface which moves radially upon expansion of the tube element to operatively connect said input and output members, a plurality of spaced-apart friction shoes connected to the exterior of said exterior surface of said tube element for radial movement therewith, a drum assembly connected to the other of said input and output members, said friction shoes being movable radially with said exterior surface of said tube element when said tube element is expanded to frictionally engage the drum assembly and operatively connect the input and output members, said friction shoes generating heat upon engagement of said friction shoes with the drum and wherein the coupling includes a thermal barrier to retard the transfer of heat generated by the friction shoes to the tube element, said thermal barrier comprising a fabric layer which retards the transfer of heat from the friction shoes toward the tube element and which adds mechanical strength to the tube element to prevent excess elongation of the tube element and extrusion of the tube element between said spaced-apart adjacent friction shoes when the tube element is expanded, and wherein said fabric has a coefficient of thermal conductivity of approximately $$\frac{0.3 \text{ BTU} \times \text{in.}}{\text{hr.} \times \text{ft.}^2 \, F^o}$$

or less.

2. A fluid expandable coupling comprising an input member, an output member rotatable relative to said input member about an axis of rotation, an annular fluid expandable tube element connected to one of the input and output members, said tube element including an exterior surface which moves radially upon expansion of the tube element to operatively connect said input and output members, a plurality of spaced-apart friction shoes connected to the exterior of said exterior surface of said tube element for radial movement therewith, a drum assembly connected to the other of said input and output members, said friction shoes being movable radially with said exterior surface of said tube element when said tube element is expanded to frictionally engage the drum assembly and operatively connect the input and output members, said friction shoes generating heat upon engagement of said friction shoes with the drum, and a thermal barrier to retard the transfer of heat generated by the friction shoes to the tube element, said plurality of friction shoes being circumferentially spaced-apart about said exterior surface of said tube element, said thermal barrier extending about said exterior surface of said tube element to add mechanical strength to said tube element to prevent extrusion of the tube element between said spaced-apart friction shoes when said tube element is expanded, said thermal barrier comprising a fabric which functions as a physical barrier to prevent heat and sparks from said friction shoes from engaging said tube element and, wherein said fabric is a woven fabric and the individual strands of fabric are skewed relative to the radial expansion of said tube element to allow said tube element to expand in a radial direction without stretching said fabric.

3. A fluid expandable coupling comprising an input member, an output member rotatable relative to said input member about an axis rotation, an annular fluid expandable tube element connected to one of the input and output members, said tube element including an exterior surface which moves radially upon expansion of the tube element to operatively connect said input and output members, and a thermal barrier operatively associated with said exterior surface of said tube element, said thermal barrier being movable radially with said exterior surface of said tube element, said tube element when expanded operatively connecting the input and output members, said input and output members effecting the generation of heat upon said input and output members being operatively connected, said thermal barrier retarding the transfer of heat to the tube element, said thermal barrier comprises a fabric layer which retards the transfer of heat toward the tube element and which adds mechanical strength to the tube element to prevent excess elongation of the tube element and wherein said fabric has a coefficient of thermal conductivity of approximately $$\frac{0.3 \text{ BTU} \times \text{in.}}{\text{hr.} \times \text{ft.}^2 \, F^o}$$

or less.

* * * * *